UNITED STATES PATENT OFFICE 2,338,908

ANTHRAQUINONE COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application November 25, 1939, Serial No. 306,200

3 Claims. (Cl. 260—376)

This invention relates to new anthraquinone compounds and their application to the art of dyeing or coloring. More particularly, the invention relates to a new class of nuclear non-sulfonated alpha aminoanthraquinone compounds and their application for the dyeing of organic derivatives of cellulose.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose, or benzyl cellulose.

It is an object of our invention to provide a new class of anthraquinone dye compounds. Another object of our invention is to provide a process for the dyeing or coloration of organic derivatives of cellulose. A further object of our invention is to provide dyed textile materials made of or containing an organic derivative of cellulose which are of good fastness to light and washing. These and other objects will hereinafter appear.

We have discovered that anthraquinone compounds containing a hydroxy group which is esterified with an organic esterifying agent and which is attached by an organic linkage to a nitrogen atom joined directly to an alpha position of the anthraquinone nucleus constitute a valuable class of compounds. While our invention relates broadly to said alpha anthraquinone organic ester compounds, it relates more particularly to anthraquinone compounds containing a hydroxyalkylamino, a hydroxyarylamino, a (hydroxyalkylamino)-arylamino, a hydroxyalkoxyarylamino or a cyclohexanolamino group esterified with an organic carboxylic acid radical in an alpha position of the anthraquinone nucleus.

The anthraquinone compounds of our invention can be obtained by esterifying anthraquinone compounds containing a hydroxyalkylamino, a hydroxyarylamino, a (hydroxyalkylamino)-arylamino, a hydroxyalkoxyarylamino, or a cyclohexanolamino group in an alpha position of the anthraquinone nucleus. Both aliphatic and aryl esterifying agents can be employed. The esterification reaction can be carried out in accordance with the usual methods employed for an esterification reaction. Usually a solvent or diluent medium non-reactive with the esterifying agent is present in the reaction mixture. Suitable solvent or diluent agents include, for example, pyridine, ethylene chloride, dioxane, ethyl acetate and dimethylaniline. As shown hereinafter these solvent or diluent agents can be used either alone or in admixture with each other.

Ester groups which can be present in the anthraquinone compounds of our invention include, for example,

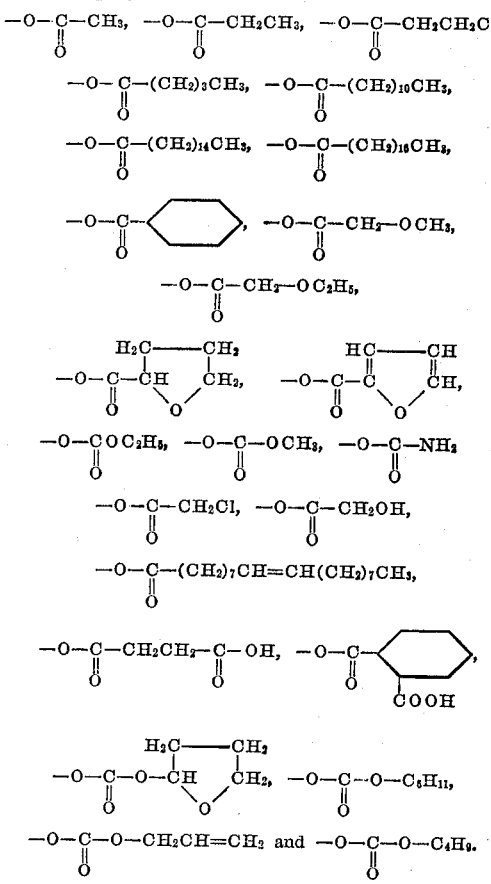

It will be understood, of course, that ester groups, such as those just given, replace a hydroxy group of the hydroxyalkylamino, hydroxyarylamino, (hydroxyalkylamino)-arylamino, a hydroxyalkoxyarylamino or cyclohexanolamino group. To illustrate, a β-hydroxyethylamino group, upon esterification with acetic anhydride, is converted to

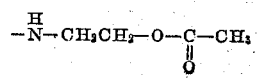

Depending upon the number of esterifiable hydroxy groups present and the reaction conditions employed, one or more ester groups can be present in the anthraquinone compounds of our invention. Where a mono-hydroxy-(alkylamino, arylamino, (alkylamino)-arylamino, alkoxyarylamino or cyclohexylamino) group is being esterified normally only one ester group will be present in the finished compound. In this situation, however, by partial esterification with one esterifying agent followed by esterification with a second esterifying agent a mixture of anthraquinone dye compounds can be obtained. Where more than one hydroxy group is present, as in a glycerylamino group, one or both the hydroxy groups can be replaced by the same ester group. The exact chemical reaction taking place where, for example, just sufficient of the esterifying agent is employed to esterify one of the hydroxy groups completely is not known. The probabilities, however, are that both hydroxy groups are esterified to some extent. By the use of a mixture of esterifying agents, such as a mixture of acetic anhydride and propionic anhydride, a mixed ester compound can be obtained.

Illustrative hydroxyalkylamino, hydroxyarylamino, (hydroxyalkylamino)-arylamino, hydroxyalkoxyarylamino and cyclohexanolamino groups which can be esterified so as to contain an ester grouping such as those previously mentioned include, for example,

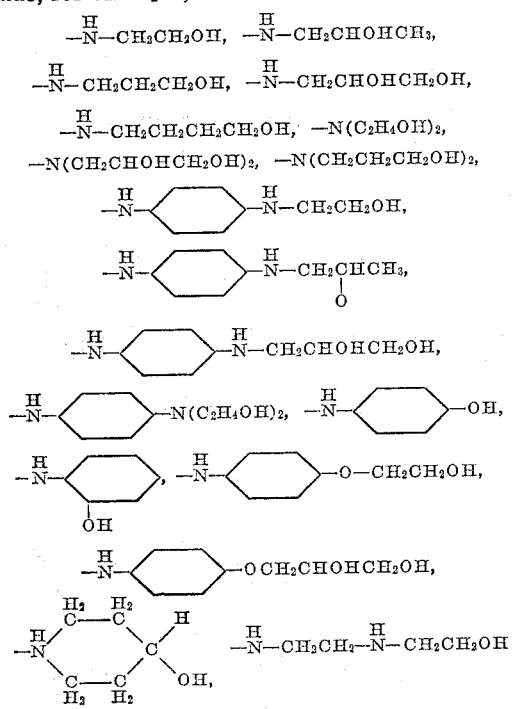

and

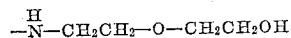

Esterification agents which can be employed in the preparation of the anthraquinone compounds of our invention include, for example, acetic anhydride, propionic anhydride, propionyl chloride, acetyl chloride, benzoyl chloride, methoxy acetic anhydride, butyric anhydride, succinic hydride, tetrahydrofuroyl chloride, phthalic anhydride, palmitic acid chloride, furoic anhydride, adipic anhydride, oleic acid chloride, furoic acid chloride, methyl chlorocarbonate, ethyl chlorocarbonate, tetrahydrofuryl chlorocarbonate, cyclohexyl chlorocarbonate, furyl chlorocarbonate, glycollic acid with $H_2SO_4$ catalyst, and allyl chlorocarbonate. The examples given hereinafter clearly teach how these and other esterification agents can be employed in the preparation of the anthraquinone compounds of our invention.

The anthraquinone compounds containing a hydroxyalkylamino, hydroxyarylamino, (hydroxyalkylamino)-arylamino, hydroxyalkoxyarylamino or cyclohexanolamino group in an alpha position of the anthraquinone nucleus and which are ordinarily employed in the preparation of the anthraquinone compounds of our invention constitute no part of the present invention. These compounds are, for the most part, described in the prior art. Generally speaking, they can be prepared by condensing a leuco anthraquinone with a hydroxyalkylamine, such as ethanolamine, diethanolamine, propanolamine or butanolamine, cyclohexanolamine, a primary hydroxyarylamine such as p-aminophenol or o-aminophenol, a hydroxyalkoxyarylamino such as 1-amino-4-β-hydroxyethoxybenzene and a (hydroxyalkylamino)-arylamine such as 1-amino-4-β-hydroxyethylaminobenzene or 1-amino-4-glycerylaminobenzene and oxidizing the leuco compound obtained to its non-leuco form. Suitable leuco anthraquinones include, for example, leuco quinizarin, leuco 1,4,5-trihydroxy anthraquinone and leuco 1,4-diaminoanthraquinone.

The anthraquinone compounds of our invention can contain one or more esterified (hydroxyalkyl-, hydroxyaryl-, (hydroxyalkylamino)-aryl-, hydroxyalkoxyaryl- or cyclohexanol-)amino groups in alpha position. In addition to these groups the anthraquinone compounds of our invention can contain other groups in alpha position. These groups include, for example, an alkoxy group, the nitro group, a hydroxy group, a halogen atom, an amino group, an alkylamino group, an arylamino group, an allylamino group, a heterocyclicamino group and an aralkylamino group. Since normally the 1 or both the 1 and 4 positions of the anthraquinone nucleus are occupied by an esterified (hydroxyalkyl-, hydroxyaryl-, (hydroxyalkylamino)-aryl-, hydroxyalkoxyaryl- or cyclohexanol-) amino group the above named groups will be present in either the 4, 5 or 8 position or the 5 or 8 position.

The anthraquinone compounds of our invention can also contain substituents in beta position. These substituents include, for example, a halogen atom, a hydroxy group, an alkoxy group, an alkyl group, a phenoxy group, a sulpho group, a carboxylic acid group, a carboxamide group or a cyano group.

Substituents, such as those just named, which can be present in an alpha or beta position, can be introduced into the anthraquinone nucleus by methods described in the art for their introduction. Thus, for example, substituted amino groups can be introduced into an alpha position of the anthraquinone nucleus by condensation of an amine with a leuco anthraquinone. Amines suitable for the condensation are primary alkyl- and cyclo-alkyl-amines such as methylamine, ethylamine, ethylene diamine, a propylamine, a butylamine, ethanolamine, propanolamine ($HOCH_2CH_2CH_2NH_2$), butanolamine ($HOCH_2CH_2CH_2CH_2NH_2$), cyclohexylamine, cyclohexanolamine, cyclobutylamine, $H_2NCH_2CH_2Cl$ and $H_2NCH_2CH_2Br$. Also aralkylamines, as for example benzylamine, phenylethylamine and omega-amino-1-methylnaphthalene and heterocyclic amines as for example 2 or 4-aminopyridine, 3-aminoquinoline, 6-aminoquinoline, 8-aminoquinoline, 1, 2 or 3-aminocarbazole, aminonaphthoquinolines, aminoacridines, 2-amino thiophene, β-amino furane and aminoacridones. Arylamines such as aniline, halogenated anilines, alkylated anilines, sulphonated anilines, nitrated anilines, alkoxy anilines, as the anisidines and the phenetidines, and hydroxy anilines can also be employed in the condensation reaction just mentioned.

The nuclear non-sulfonated anthraquinone compounds of our invention, as previously indicated, constitute valuable dyes which may be employed for the dyeing or coloration of organic derivatives of cellulose. These nuclear non-sulfonated compounds likewise possess some application for the dyeing of wool. The nuclear sulfonated anthraquinone compounds of our invention possess little or no affinity for the dyeing of organic derivatives of cellulose but are generally suitable for dyeing wool and, in some cases, for dyeing vegetable fibers. If the products contain a sulfonic acid group or groups, such group or groups may be present in the initial materials or may be introduced by a subsequent treatment with sulfonating agents. Sulfonic groups can be present, for example, in the 2- and 5-positions. While our invention will be described more particularly in connection with the dyeing of cellulose acetate silk, a material to which the compounds are especially adapted, it will be understood that it is applicable to the dyeing of other organic derivatives of cellulose such as those previously named. Similarly, the dye compounds of our invention may be applied to materials other than organic derivatives of cellulose, such as those hereinbefore indicated, by known methods for their application to such materials. Dyeings of good fastness to light and washing are obtained.

It is apparent from the foregoing that a wide variety of compounds are included within the scope of our invention. In the examples given hereinafter only a few of the possible compounds are shown but it will be understood that the examples given are intended to be illustrative and not limitative of the invention. While it is not feasible to attempt to illustrate all possible variations, the examples given clearly teach how the various compounds included within the scope of our invention can be prepared.

*Example 1*

27 grams of 1-β-hydroxyethylaminothraquinone are dissolved in 200 cc. of pyridine and 11 grams of acetic anhydride are added dropwise at 60° C. with stirring. After three hours at 60° C., the reaction mixture is poured into water and the precipitated dye compound is recovered by filtration, washed with water and dried. The dye compound obtained has the formula:

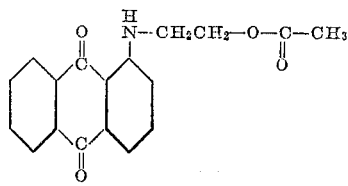

and colors cellulose acetate silk a red shade.

By the treatment of 35 grams of 1-glycerylamino - 4 - propylaminoanthraquinone with 22 grams of acetic anhydride in accordance with the method described above, an anthraquinone dye compound is obtained in which the glycerylamino group is converted to a

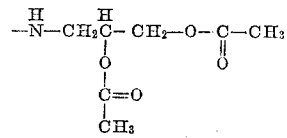

group. This dye compound colors cellulose acetate silk a blue shade.

*Example 2*

31.5 grams of 1-β-hydroxyethylamino-4,5,8-trihydroxyanthraquinone are dissolved in 300 cc. of pyridine and 11 grams of acetic anhydride are added dropwise with stirring at room temperature. After stirring for several hours the reaction product is heated to 90° C. for an hour, poured into water, filtered, washed with water and dried. A dye compound in which the β-hydroxyethylamino group is converted to a

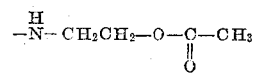

group is obtained. This compound colors cellulose acetate silk purple. By the treatment of other 1-hydroxyalkylaminoanthraquinones, which are substituted or not, in the 4, 5 and 8 positions with substituents such as those indicated hereinbefore, with acetic anhydride in accordance with the method described above, further compounds included within the scope of our invention can be obtained.

*Example 3*

31.3 grams of 1 - γ - hydroxypropylamino - 4 - methoxyanthraquinone are dissolved in 200 cc. of pyridine and 9.5 grams of propionyl chloride are added dropwise, with stirring, at room temperature. The reaction mixture resulting is warmed on a steam bath for one hour, poured into water, and the precipitated dye compound is recovered by filtration, washed with water and dried. The dye compound obtained has the formula:

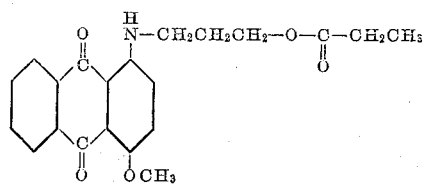

and colors cellulose acetate silk a violet shade.

*Example 4*

34.2 grams of 1-glycerylamino-4-nitroanthraquinone are dissolved in dry ethylene chloride and 15 grams of benzoyl chloride are slowly added. The reaction mixture is then heated to boiling for one hour following which the solvent is removed by distillation and the residue treated with a cold aqueous sodium carbonate solution. The dye compound formed is recovered by filtration, washed with water and dried. The exact formula of the dye compound obtained is not known but either one of the OH groups of the glycerylamino radical is substantially converted to a

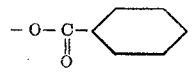

group or both OH groups are partially converted to such a group. The probabilities are that a mixture of the dyes indicated are formed. The dye mixture obtained colors cellulose acetate silk a red-violet shade.

Example 5

28.2 grams of 1-β-hydroxyethylamino-4-aminoanthraquinone are dissolved in a mixture of dioxane and pyridine. 11 grams of acetic anhydride are added dropwise at room temperature and, following its addition, the reaction is completed by heating for several hours on a steam bath. The reaction mixture is then poured into water and the dye compound formed is recovered by filtration, washed and dried. By this treatment the β-hydroxyethylamino group of the starting material is converted to a

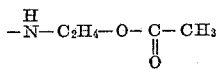

group while the amino group in the 4-position remains unchanged. The dye compound formed colors cellulose acetate silk deep violet shades.

By treating 1-β-hydroxypropylamino-4-aminoanthraquinone and 1-γ-hydroxypropylamino-4-aminoanthraquinone with methoxy acetic anhydride and succinic anhydride, respectively, in a similar manner as that just described, anthraquinone compounds, in which the amino groups are unaffected but in which the β-hydroxypropylamino and γ-hydroxypropylamino groups are converted to

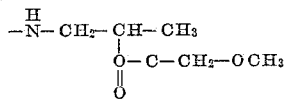

and

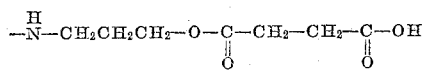

groups, respectively, can be obtained.

35.8 grams of 1-β-hydroxyethylamino-4-phenylaminoanthraquinone can similarly be dissolved in pyridine and esterified in accordance with the above example with 17 grams of methoxyacetic anhydride to obtain a dye which colors cellulose acetate silk blue and in which the β-hydroxy ethylamino group is altered as indicated above.

Example 6

41 grams of the hydrochloride of 1-(4'-amino)-phenylamino-4-β-hydroxyethylaminoanthraquinone are dissolved in pyridine and esterified with 11 grams of acetic anhydride. After esterification, the reaction mixture is poured into water, treated with sodium bicarbonate and the dye compound formed is recovered by filtration, washed with water and dried. By this treatment, a dye is obtained which colors cellulose acetate silk greenish blue shades. Similarly, 1-γ-hydroxypropylamino-4-(2'-methoxy-4'-amino)-phenyl-aminoanthraquinone and 1-γ-hydroxypropylamino-4-(2'-methoxy-4'-methylamino)-phenylaminoanthraquinone can be reacted with acetic anhydride or methoxy acetic anhydride, for example, to obtain dye compounds in which the γ-hydroxypropylamino groups are converted to

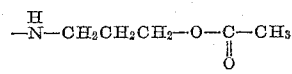

and

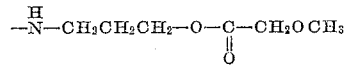

groups, respectively.

Example 7

0.1 gram mole of 1,4-di-β-hydroxyethylaminoanthraquinone are dissolved in 250 cc. of pyridine and a mixture of 0.1 gram mole (slight excess) of acetic anhydride and 0.1 gram mole (slight excess) of butyric anhydride is added dropwise at about 60° C. with stirring. After heating at about 60° C. until reaction is complete the reaction mixture is poured into water and the precipitated dye compound is recovered by filtration, washed with water and dried. A compound is obtained in which the hydroxyethyl groups originally present in the 1 and 4 positions are probably converted to

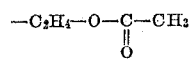

and

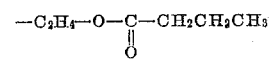

respectively. This compound colors cellulose acetate silk blue.

Similarly by the treatment of 1,4-di-β-hydroxyethylaminoanthraquinone with a mixture of acetic anhydride and methoxy acetic anhydride the hydroxyethyl groups in the 1 and 4 position can be converted to

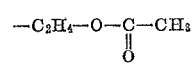

and

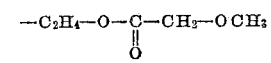

respectively. The dye compound thus obtained colors cellulose acetate silk blue.

Example 8

0.1 gram mole of 1-methylamino-4-β-hydroxyethylaminoanthraquinone is treated with 0.1 gram mole (slight excess) of acetic anhydride in accordance with Example 1.

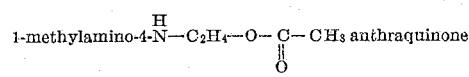

is obtained. This compound colors cellulose acetate silk deep blue shades.

1-methylamino-4-β-hydroxyethylamino can similarly be treated with propionyl chloride, butyric anhydride, valeric anhydride and methoxy acetic anhydride to obtain compounds wherein the hydroxyethyl group is converted to

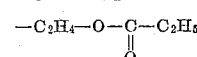

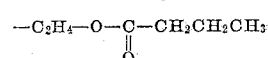

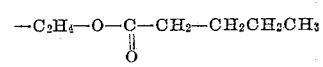

and

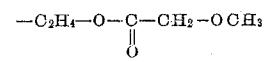

respectively. The compounds obtained color cellulose acetate silk blue.

Example 9

0.1 gram mole of 1-methylamino-4-(4'-β-hydroxyethylamino) phenylamino anthraquinone is reacted in pyridine with 11 grams of acetic anhydride in accordance with the general procedure described in Example 1. The hydroxyethylamino group is thus converted to a

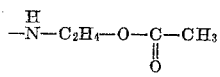

group. The dye compound obtained colors cellulose acetate silk blue.

Example 10

0.1 gram mole of 1,4-di-β-hydroxyethylamino anthraquinone is reacted in pyridine with 10 grams of chloroacetic acid.

1-β-hydroxyethylamino-4-N(H)—C₂H₄—O—C(=O)— CH₂Cl anthraquinone is obtained and colors cellulose acetate silk blue.

0.1 gram mole of 1,4-di-β-hydroxyethylamino anthraquinone can similarly be reacted with 0.1 gram mole of propionyl chloride, valeric anhydride and caproic anhydride, respectively, to obtain

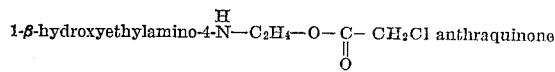

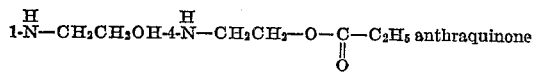

and

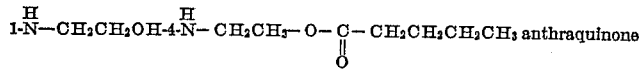

respectively. Each of these compounds colors cellulose acetate blue.

Example 11

0.1 gram mole of 1,4-di-β-hydroxyethylamino anthraquinone is reacted in pyridine or di-methylaniline with chloroacetylchloride. The compound thus formed is recovered and hydrolyzed by heating in water with sodium bicarbonate. By this treatment a compound is obtained in which a hydroxyethyl group is converted to

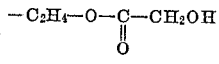

This dye compound colors cellulose acetate silk blue.

Example 12

0.1 gram mole of 1,4-di-β-hydroxyethylamino anthraquinone is reacted in pyridine with about 0.1 gram mole (slight excess) of maleic anhydride. A hydroxyethyl group is converted to

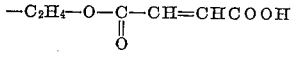

The dye compound obtained colors cellulose acetate silk blue.

0.1 gram mole of 1,4-di-β-hydroxyethylamino anthraquinone can similarly be reacted with 5 grams of formic acid to convert one of the hydroxyethyl groups to a

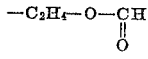

group. The dye compound obtained colors cellulose acetate silk blue.

By the use of sufficient maleic anhydride or formic acid both hydroxyethyl groups can be converted to the groups mentioned.

The free acid form of the dye compounds of this example can be converted to a water-soluble salt form by dissolving the free acid ester form in an aqueous alkaline solution such as that of sodium carbonate, sodium hydroxide, potassium carbonate or by adding an alkali metal carbonate such as sodium carbonate or potassium carbonate to the reactants. It will be understood, of course, that the free acid form of the dyes of our invention can be converted to their water-soluble salt form by treatment in the manner just stated or by any other suitable means.

Example 13

0.1 gram mole of 1-β-hydroxypropylamino-4-benzylamino anthraquinone are added to 250 cc. of dioxane and about 0.1 gram mole (slight excess) of ethyl chlorocarbonate are added dropwise with stirring. Advantageously sufficient alkali (0.1 gram mole), such as sodium carbonate, should be present in the reaction mixture to neutralize any hydrochloric acid formed by the reaction. Upon completion of the reaction the reaction mixture is poured into water and the precipitated dye compound is recovered by filtration, washed with water and dried. The β-hydroxypropyl group is converted to a

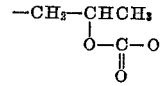

group. The dye compound obtained colors cellulose acetate silk blue.

0.1 gram mole of 1-n-Δ-hydroxybutylamino-4-n-butylamino anthraquinone can be reacted with carbamyl chloride (NH₂COCl) to convert the hydroxyl-butyl group to

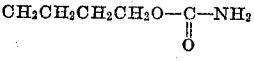

The dye compound thus formed colors cellulose acetate silk blue.

Example 14

33.8 grams of 1-β-hydroxyethylamino-4-γ-hydroxypropylamino anthraquinone are dissolved in acetic acid and an esterification catalyst such as p-toluene sulfonic acid, sulfuric acid, hydrochloric acid or phosphoric acid is added. The mixture is then heated on a water bath until reaction is complete following which it is poured into water and the precipitated dye compound is recovered by filtration, washed with water and dried. The dye thus prepared colors cellulose acetate silk blue shades.

The following tabulation, identified as Tabulation A, further illustrates di-substituted anthraquinone compounds included within the scope of our invention together with the color they produce on cellulose acetate silk. These compounds can be produced in accordance with the methods hereinbefore described. For simplicity, only the groups present on the anthraquinone nucleus and their position on the nucleus are given.

*Tabulation A*

| Compound No. | Position 1 | Position 4 | Color |
|---|---|---|---|
| 1 | $-\overset{H}{N}-C_2H_4-O-\underset{\underset{O}{\parallel}}{C}-CH_3$ | $-\overset{H}{N}-\text{C}_6\text{H}_4-NH_2$ | Blue-green. |
| 2 | $-\overset{H}{N}-C_2H_4-O-\underset{\underset{O}{\parallel}}{C}-CH_3$ | $-\overset{H}{N}-C_2H_4-O-\underset{\underset{O}{\parallel}}{C}-CH_3$ | Blue. |
| 3 | $-\overset{H}{N}-C_2H_4-O-\underset{\underset{O}{\parallel}}{C}-CH_2-OCH_3$ | $-\overset{H}{N}-C_2H_4OH$ | Do. |
| 4 | $-\overset{H}{N}-C_2H_4-O-\underset{\underset{O}{\parallel}}{C}-C_3H_7$ | $-\overset{H}{N}-C_2H_4OH$ | Do. |
| 5 | $-\overset{H}{N}-C_2H_4-O-\underset{\underset{O}{\parallel}}{C}-CH_3$ | $-OH$ | Violet. |
| 6 | $-\overset{H}{N}-C_2H_4-O-\underset{\underset{O}{\parallel}}{C}-C_2H_5$ | $-OH$ | Do. |
| 7 | $-\overset{H}{N}-C_2H_4-O-\underset{\underset{O}{\parallel}}{C}-CH_2OCH_3$ | $-OH$ | Do. |
| 8 | $-\overset{H}{N}-C_2H_4-O-\underset{\underset{O}{\parallel}}{C}-C_6H_5$ | $-\overset{H}{N}-C_2H_4OH$ | Blue-green. |
| 9 | $-\overset{H}{N}-C_2H_4-O-\underset{\underset{O}{\parallel}}{C}-OC_2H_5$ | $-\overset{H}{N}-C_2H_4-O-\underset{\underset{O}{\parallel}}{C}-OC_2H_5$ | Blue. |
| 10 | $-\overset{H}{N}-C_2H_4-O-\underset{\underset{O}{\parallel}}{C}-CH_3$ | $-\overset{H}{N}-C_2H_4-OCH_3$ | Do. |
| 11 | $-\overset{H}{N}-C_2H_4-O-\underset{\underset{O}{\parallel}}{C}-CH_3$ | $-\overset{H}{N}-C_2H_4-OC_2H_5$ | Do. |
| 12 | $-\overset{H}{N}-C_2H_4-O-\underset{\underset{O}{\parallel}}{C}-CH_3$ | $-\overset{H}{N}-CH_2CH_2CH_3$ | Do. |
| 13 | $-\overset{H}{N}-C_2H_4-O-\underset{\underset{O}{\parallel}}{C}-CH_3$ | $-\overset{H}{N}-C_2H_5$ | Do. |
| 14 | $-\overset{H}{N}-C_6H_4-OCH_2CH_2-O-\underset{\underset{O}{\parallel}}{C}-CH_3$ | $-\overset{H}{N}-CH_2CH_2-O-SO_3Na$ | Do. |
| 15 | $-\overset{H}{N}-C_2H_4-O-\underset{\underset{O}{\parallel}}{C}-CH_3$ | $-\overset{H}{N}-CH_2-CH=CH_2$ | Do. |
| 16 | $-\overset{H}{N}-CH_2CH_2-O-\text{acid phthalate}$ | $-\overset{H}{N}-CH_2-CH=CHCH_3$ | Do. |
| 17 | $-\overset{H}{N}-C_6H_4-\overset{H}{N}-CH_2CH_2-O-\underset{\underset{O}{\parallel}}{C}-CH_3$ | $-\overset{H}{N}-CH_3$ | Blue-green. |
| 18 | $-\overset{H}{N}-C_6H_4-N\begin{smallmatrix}CH_2CH_2OH\\ \\CH_2CH_2-O-\underset{\underset{O}{\parallel}}{C}-CH_3\end{smallmatrix}$ | $-\overset{H}{N}-C_2H_5$ | Do. |
| 19 | $-\overset{H}{N}-C_6H_4-\overset{H}{N}-CH_2CH_2CH_2-O-\underset{\underset{O}{\parallel}}{C}-CH_3$ | $-\overset{H}{N}-CH_2CH_2-OCH_3$ | Do. |
| 20 | $-\overset{H}{N}-CH_2CH_2-O-\underset{\underset{O}{\parallel}}{C}-CH\begin{smallmatrix}H_2C-CH_2\\ \hspace{6pt}\diagdown\hspace{2pt}\diagup\\ \hspace{10pt}O\end{smallmatrix}$ | $-\overset{H}{N}-C_2H_5$ | Blue. |
| 21 | $-\overset{H}{N}-\text{cyclohexyl}-O-\underset{\underset{O}{\parallel}}{C}-OC_4H_9$ | $-\overset{H}{N}-CH_2-CH\begin{smallmatrix}H_2C-CH_2\\ \hspace{6pt}\diagdown\hspace{2pt}\diagup\\ \hspace{10pt}O\end{smallmatrix}$ | Do. |
| 22 | $-\overset{H}{N}-C_6H_4-O-\underset{\underset{O}{\parallel}}{C}-CH_3$ | $-\overset{H}{N}-C_2H_5$ | Do. |
| 23 | $-\overset{H}{N}-CH_2CH_2-O-CH_2CH_2-O-\underset{\underset{O}{\parallel}}{C}-CH_3$ | $-\overset{H}{N}-CH_3$ | Do. |
| 24 | $-\overset{H}{N}-CH_2CH_2-\overset{CH_3}{N}-CH_2CH_2-O-\underset{\underset{O}{\parallel}}{C}-CH_3$ | $-\overset{H}{N}-C_2H_5$ | Do. |

Tabulation B

This tabulation lists illustrative tri- and tetra-substituted anthraquinone compounds which are included within the scope of our invention together with the color they produce on cellulose acetate silk.

taining a substituent in a β-position, as previously indicated, can likewise be esterified with an organic esterifying agent in accordance with our invention. Suitable compounds of this character include, for example, 1-β-hydroxyethylamino-2-sulfonic anthraquinone, 1 - β - hydroxypropyl-

| Compound No. | Position 1 | Position 4 | Position 5 | Position 8 | Color |
|---|---|---|---|---|---|
| 1 | -NH-CH$_2$CH$_2$CH$_2$-O-C(=O)-C$_3$H$_7$ | OH | OH | OH | Purple. |
| 2 | -NH-CH$_2$CHOHCH$_2$-O-C(=O)-CH$_2$OCH$_3$ | OH | OH | OH | Do. |
| 3 | -NH-CH$_2$CH$_2$CH$_2$CH$_2$-O-C(=O)-C$_6$H$_5$ | OH | NH$_2$ | OH | Do. |
| 4 | -NH-CH$_2$CH$_2$CH$_2$-O-C(=O)-C$_2$H$_5$ | OCH$_3$ | NH$_2$ | OH | Do. |
| 5 | -NH-CH$_2$CH$_2$-O-C(=O)-CH(epoxy) | NH$_2$ | OH | OCH$_3$ | Blue. |
| 6 | -NH-C$_2$H$_4$-O-C(=O)-C$_2$H$_5$ | -NH-C$_2$H$_4$OH | OH | OH | Greenish-blue. |
| 7 | -NH-C$_2$H$_4$-O-C$_2$H$_4$-O-C(=O)-CH$_3$ | NH$_2$ | OH | | Blue. |
| 8 | -NH-C$_2$H$_4$-O-C(=O)-CH$_3$ | -NH-C$_2$H$_4$OH | | OH | Greenish-blue. |
| 9 | -NH-C$_2$H$_6$-O-C(=O)-CH$_2$-OCH$_2$-C$_6$H$_5$ | -NH-C$_3$H$_6$-O-SO$_3$NH$_4$ | NH$_2$ | OH | Do. |
| 10 | -NH-CH$_2$CHO-C(=O)-CH$_2$CH$_2$OH | -NH-C$_4$H$_9$ | NH$_2$ | OH | Do. |
| 11 | -NH-C$_2$H$_4$-O-C(=O)-CH$_3$ | -NH-C$_6$H$_5$ | CH$_3$ | OH | Do. |
| 12 | -NH-C$_2$H$_6$-O-C(=O)-CH(epoxy-CH$_2$CH$_2$) | NH$_2$ | -NH-CH$_3$ | OH | Do. |
| 13 | -NH-C$_2$H$_4$-O-C(=O)-C$_2$H$_5$ | -N(CH$_3$)-C$_6$H$_5$ | OH | -NH-C$_6$H$_5$ | Do. |
| 14 | -NH-C$_2$H$_4$-O-C(=O)-CH$_3$ | OH | -NH-C$_2$H$_4$-O-C(=O)-CH$_3$ | OH | Blue. |
| 15 | -NH-C$_2$H$_4$-O-acid maleate | -NH-CH$_3$ | OH | OH | Greenish-blue. |
| 16 | -NH-C$_2$H$_6$-O-stearate | -NH-C$_6$H$_4$-NH$_2$ | NH$_2$ | -NH-C$_2$H$_5$ | Do. |
| 17 | -NH-C$_2$H$_4$-O-laurate | -NH-C$_2$H$_4$SO$_3$Na | -NH-C$_2$H$_4$SO$_3$Na | -NH-C$_2$H$_4$-O-laurate | Do. |
| 18 | -NH-C$_6$H$_{10}$-O-C(=O)-CH$_3$ | -NH-C$_2$H$_5$ | | -NH-C$_2$H$_5$ | Do. |
| 19 | -NH-C$_2$H$_4$-N(CH$_3$)-C$_2$H$_4$-O-C(=O)-CH$_3$ | NH$_2$ | -NO$_2$ | OH | Blue. |

Alpha (hydroxyalkyl-, hydroxyaryl-, (hydroxyalkylamino)-arylhydroxyalkoxyaryl- and cyclohexanol-) amino anthraquinone compounds containing a substituent in a β-position, as previously indicated, can likewise be esterified with an organic esterifying agent in accordance with our invention. Suitable compounds of this character include, for example, 1-β-hydroxyethylamino-2-sulfonic anthraquinone, 1-β-hydroxypropylamino-2-carboxyl-4-ethylamino anthraquinone, 1-ethylamino-2-carboxamide-4-γ-hydroxypropylamino anthraquinone, 1-amino-2-chloro-5-β- hydroxyethylamino anthraquinone, 1-β-hydroxyethylamino-4-methylamino-6-chloro anthraquinone and 1-β-hydroxypropylamino-4-allylamino-7-hydroxy anthraquinone. Each of these compounds can be treated with the organic esterifying agents disclosed herein to obtain dye compounds included within the scope of our invention.

Both water-insoluble and water-soluble compounds are included within the scope of our invention and, accordingly, in employing them as dyes, the method of application will vary depending on whether a water-soluble or water-insoluble compound is involved. The water-insoluble dyes will ordinarily be applied to the material in the form of an aqueous suspension which can be prepared by grinding the dye to a paste in the presence of soap or other suitable dispersing agent and dispersing the resulting paste in water.

The water-soluble componds of our invention do not require a solubilizing or dispersion treatment and may be added directly to an aqueous neutral dye bath and applied directly therefrom to the material undergoing coloration. If desired, common salt may be added to promote exhaustion of the dyebath.

Dyeing operations can be conducted at a temperature of 80–85° C., but any suitable temperature may be employed. In accordance with the usual dyeing practice, the material to be dyed will ordinarily be added to the dyebath at a temperature lower than that at which the main portion of the dyeing is to be effected, a temperature approximating 45–55° C. for example, following which the temperature of the dyebath will be raised to that selected for carrying out the dyeing operation. The temperature at which the dyeing is conducted will vary, depending for example, on the particular material or materials undergoing coloration.

It will be understood that the anthraquinone compounds may be applied to the material to be colored in any suitable manner. Coloration may be effected, for example, by dyeing, printing or stenciling. Dispersing or solubilizing agents that can be employed for preparing suspensions of the insoluble dye compounds include soap, sulphoricinoleic acid, a salt of a sulphoricinoleic acid, and sulfonated oleic, stearic or palmitic acid, or salts thereof, such, for instance, as the sodium or ammonium salts.

The following example illustrates how dyeing may be carried out in accordance with our invention. Quantities are expressed in parts by weight.

*Example A*

2.5 parts of the second dye compound of Example 1 are finely ground with a dispersing agent such as soap and the resulting paste is dispersed in 1000 parts of water heated to 45–55° C. 100 parts of cellulose acetate silk in the form of threads, fibers or fabric, for example, are then entered and the temperature is gradually raised to 80–85° C. and the silk worked at this temperature until dyeing is complete. The cellulose acetate silk is dyed a blue shade. By the addition of sodium chloride the depth of the dyeing can be controlled and exhaustion of the dyebath promoted. The water soluble compounds of our invention may be employed to dye cellulose acetate silk, for example, in accordance with the dyeing operation described above except that a dispersing agent is not necessary.

We claim:

1. The anthraquinone compound having the formula:

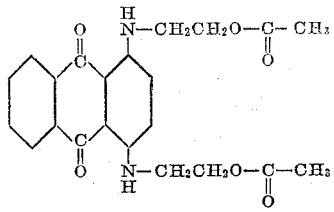

2. The anthraquinone dye compounds having the general formula:

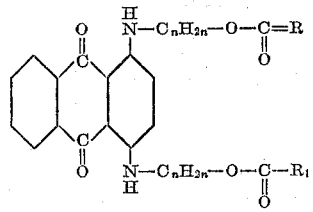

wherein R and R₁ each represents an alkyl group containing 1 to 4 carbon atoms and $n$ stands for a member selected from the group consisting of 2, 3 and 4.

3. The anthraquinone dye compounds having the formula:

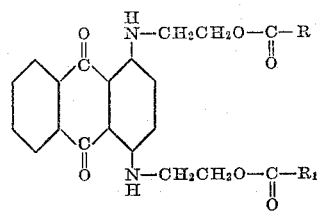

wherein R and R₁ each stands for an alkyl group containing from 1 to 4 carbon atoms.

JOSEPH B. DICKEY.
JAMES G. McNALLY.

CERTIFICATE OF CORRECTION.

Patent No. 2,338,908.   January 11, 1944.

JOSEPH B. DICKEY, ET AL.

It is hereby certified that error appears in the printed specification of the above numbered patent requiring correction as follows: Page 8, second column, line 30, claim 2, in the formula, strike out the double bond before the letter "R" and insert instead a single bond; and that the said Letters Patent should be read with this correction therein that the same may conform to the record of the case in the Patent Office.

Signed and sealed this 28th day of March, A. D. 1944.

Leslie Frazer (Seal)   Acting Commissioner of Patents.